April 22, 1930. M. S. RUNSVOLD 1,755,612
AUTOMATIC HEAT REGULATING DEVICE
Filed Aug. 29, 1927
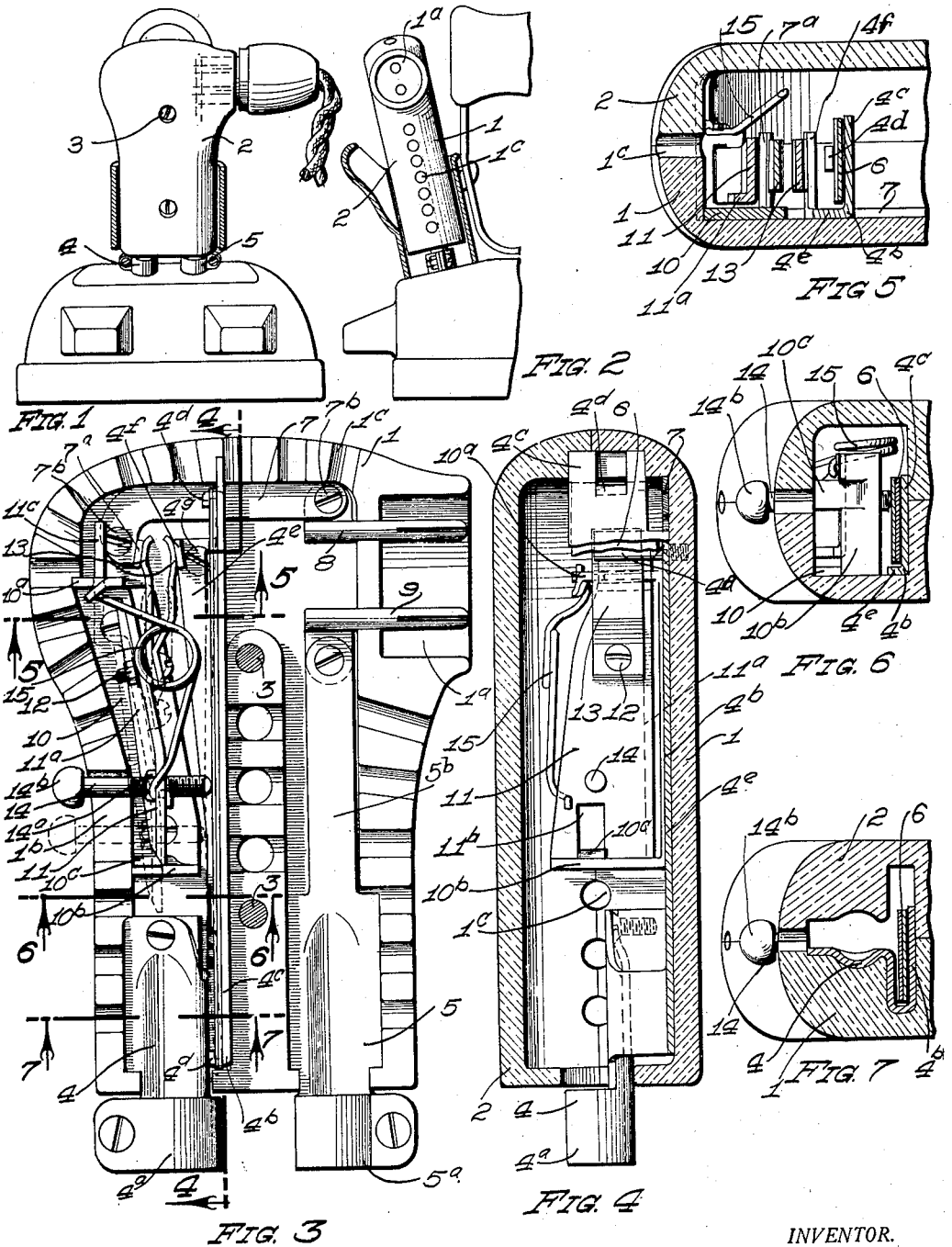
INVENTOR.
MARTIN S. RUNSVOLD
BY A. B. Bornman
ATTORNEY Patented Apr. 22, 1930

1,755,612

UNITED STATES PATENT OFFICE

MARTIN S. RUNSVOLD, OF SAN DIEGO, CALIFORNIA

AUTOMATIC HEAT-REGULATING DEVICE

Application filed August 29, 1927. Serial No. 216,112.

My invention relates to automatic heat regulating devices, particularly adapted for electric connection plugs used in connection with electrical heating apparatus, and the objects of my invention are: first, to provide an automatic heat regulating means in which the controlling thermostat means causes the circuit to instantly break at any predetermined temperature; second, to provide an electric connection plug of this class which is adapted to be secured to the terminals of the electric heating apparatus by clamp means, thus conducting the heat from the electric heating apparatus more efficiently to the thermostat; third, to provide a device of this class in which the thermostat is adjacent along the whole of its length to a heat conducting medium, thereby making the thermostat readily responsive to the changes in temperature of the electric heating apparatus; fourth, to provide a device of this class in which means is provided for regulating the temperature at which the thermostat breaks the circuit; fifth, to provide a device of this class in which the thermostat is under little or no mechanical strain; sixth, to provide a device of this class in which the contact is quickly broken thereby preventing arcing and deteriorating of the contact; seventh, to provide a device of this class in which plunger terminals are provided in the upper side of the iron by conventional plug, thus the electric cord can be removed from the apparatus without removing the plug from the terminals of the electric heating apparatus; eighth, to provide a device of this class which is easily adaptable to any style of electric heating apparatus; ninth, to provide a device of this class which is encased in a perforated casing adapted to be readily ventilated by the atmosphere so as to quickly cool the connected and associated elements of the thermostat means and electric and heat conducting members so as to decrease to the smallest possible range the temperature at which the contact controlled by the thermostat means are broken and made; tenth, to provide a device of this class for electric heating apparatus which will readily respond and be actuated by the heat of the connecting heating apparatus; eleventh, to provide a device of this class in which the thermostat switch is manually closed after being opened by the action of the thermostat means; twelfth, to provide as a whole a novelly constructed and arranged heat regulating means of this class, and thirteenth, to provide a means of this class which is particularly simple and economical of construction, durable, highly efficient, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Fig. 1 is an end elevational view of an iron with my automatic heat regulating means incorporated in a connection plug, and with parts and portions of the iron broken away and in sections to facilitate the illustration. Fig. 2 is a fragmentary side elevational view thereof with parts and portions of the iron broken away and in sections to facilitate the illustration. Fig. 3 is an enlarged side elevational view of my automatic heat regulating means, with one side of the casing removed to facilitate the illustration. Fig. 4 is a longitudinal sectional view thereof through 4—4 of Fig. 3. Fig. 5 is a fragmentary transverse sectional view thereof through 5—5 of Fig. 3. Fig. 6 is a fragmentary transverse sectional view thereof through 6—6 of Fig. 3, and Fig. 7 is a transverse sectional view thereof through 7—7 of Fig. 3.

Like characters of reference refer to similar parts and portions throughout the several views of the drawings.

Casings 1 and 2, bolt 3, terminal sockets 4 and 5, thermostat 6, conductor 7, plug terminals 8 and 9, switch support 10, switch 11, switch contact bolt 12, switch contact 13, switch setting and regulating screw 14, and spring 15, constitute the principal parts and portions of my heat regulating means.

The casing of my automatic heat regulating means, when incorporated in an electric connection plug as shown in the drawings, may be made of suitable insulated material as now employed for making similar connection plugs. The casing consists of a pair of casing members 1 and 2, hollowed at their one side and secured together with their hollow portions adjacent to each other by means of suitable bolts 3. The thermostat control and switch mechanism are mounted in the casing 1, the casing 2 serving as a cover thereover.

Secured in the casing 1 and extending from the one end thereof are terminal sockets 4 and 5, which are dished or hollowed out longitudinally, and terminate in clamp members $4^a$ and $5^a$ respectively, which are provided with bolts for securing the clamp portion of the terminal sockets to the terminals of the electric heating apparatus.

The terminal 4 is provided with a conductor portion $4^b$ integral with the terminal 4 and which is L-shaped in cross-section. The side portion $4^c$ which forms the longer leg of the L-shaped conductor portion, extends approximately the length of the iron plug and is embedded at its upper end in the upper side walls of the casings 1 and 2. The ends of the side member $4^c$ are provided with curved lugs $4^d$ which loosely retain the slotted ends of a thermostat member 6. The base member $4^e$ of the conductor $4^b$, which forms the base of the L-shaped conductor, increases in width as it approaches the upper portion of the casing 1 and is provided at its upper extremity with an upwardly extending contact lug $4^f$. A screw $4^g$ secures the upper end of the conductor $4^c$ in position. Spaced apart from the contact member $4^f$ is a similar contact lug $7^a$ which extends upwardly from a conductor 7. The conductor 7 is held in position at its ends by means of screws $7^b$. One of the screws $7^b$ also holds the conductor 7 in contact with a terminal plug contact 8.

The terminal socket 5 is provided with an upwardly extended flat conductor $5^b$ which is held in position and in contact with a terminal plug 9 similar to the terminal plug 8. The terminal plugs 8 and 9 are supported partly by the casing 1 and partly by the casing 2 and extend into a cylindrical opening $1^a$ formed by the junction of the two casings as shown best in Figs. 1, 2, and 3 of the drawings. The plug contacts 8 and 9 are connected to a conventional plug means as shown in Fig. 1 of the drawings.

Positioned between the upper sides of the terminal socket 4 and the lower side of the conductor 7 and spaced apart therefrom, is a switch support 10 which is provided with an upwardly extending end member $10^a$ at the upper end thereof which is provided with a slot therein for supporting one end of a switch member 11. Another upwardly extending end member $10^b$ is provided at the lower end of the support 10, which is provided with a lug $10^c$ that extends from the side thereof and is bent upwardly from the inner face thereof. The switch member 11 is formed of comparatively heavy metal with an offset lug $11^c$ at the one end thereof which fits into a slot in the upper end member $10^a$ of the switch support 10. The under edge is turned at an angle with the switch forming a rib $11^a$ which strengthens the switch. The other end of the said switch member 11 is provided with a slot $11^b$ therein. The slot $11^b$ straddles the lug $10^c$, and the lower ends of the switch 11 rest against the upper side of the lower end portion $10^b$ when the switch is in closed position as shown by the solid lines in Figs. 3, 4, and 6 of the drawings. Secured to the switch 11 by means of a bolt 12, and insulated therefrom, are switch contact members 13 which extend between the contact lugs $7^a$ and $4^f$ when the switch is in its normal closed position.

Extending crosswise with the switch 11, and screwably mounted therein opposite the approximate center of the thermostat 5, is an adjusting screw 14, which is provided with a lock nut $14^a$ which locks the adjusting screw in any desired position. The adjusting screw 14 rests against the thermostat 5 and transmits the movement of the thermostat to the switch 11. The adjusting screw extends through a slot $1^b$ formed by the two casings 1 and 2, and serves as a setting means when the circuit is broken.

A spring 15 is provided, the one end of which is supported in the end portion $10^a$ of the switch support 10 and the other end of which is mounted in the switch member 11. The spring 15 tends to open the switch 11 but is prevented from doing so by the end portion $10^b$ of the switch support 10.

In the side walls of the casing members 1 and 2 are provided a plurality of spaced apart, oppositely disposed, semi-cylindrical grooves which form, when the two casings are put together, ventilating holes $1^c$ which provide a circulation of air through the plug for cooling the thermostat member, terminal socket, switch and spring member after the same are heated, and for cooling the thermostat member so that it will quickly return to its normal position as shown by the solid lines in Fig. 3 of the drawings.

The operation of my automatic heat regulating means is as follows: The heat from the electric heating apparatus is conducted into the plug by means of the terminal socket 4 and along the conductor $4^b$. The thermostat 6 which is positioned adjacent to the heat conducting means is warped as the heat increases and engages the regulating means 14. As the thermostat warps, the switch 11 is moved until the lower end thereof disengages the end portion $10^b$ of the support 10. The spring 15 then causes the switch to move downwardly and the switch contact 13 to disengage the contact lugs 6ª and 4ᶠ respectively, move to the position shown by dotted lines in Fig. 3 of the drawings, and thus break the circuit. By regulating the screw 14 the temperature at which the circuit is broken is controlled. To set the heat regulating means the switch is placed in its closed position by pressing upwardly and inwardly on the extending end of the screw 14.

Though I have shown and described a particular construction, combination and arrangement of parts and portions, and a particular adaptation of my automatic heat regulating means, I do not wish to be limited to this particular construction, combination and arrangement, nor to the particular adaptation, but desire to include in the scope of my invention the construction, combination and arrangement substantially as set forth in the appended claims.

Having thus described my invention, what I claim as new and desire to secure by Letters Patent is:

1. In an automatic heat regulating means, a heat and current conducting thermostat support means, a heat distortable thermostat, loosely secured at its ends by said support means, a contact at the one end of said support means, another contact spaced apart from said first mentioned contact, a switch support, a switch slidably mounted thereon, contacts on said switch adapted to connect said first and second mentioned contacts, means for frictionally holding said switch in closed position on said switch support, and means actuated by said thermostat for releasing said switch from engagement with said support.

2. In an automatic heat regulating means, a heat and current conducting thermostat support means, a heat distortable thermostat, loosely secured at its ends by said support means, a contact at the one end of said support means, another contact spaced apart from said first mentioned contact, a switch support, a switch slidably mounted thereon, contacts on said switch adapted to connect said first and second mentioned contacts, means for frictionally holding said switch in closed position on said switch support, means actuated by said thermostat for releasing said switch from engagement with said support, and spring means for normally forcing said switch member to an open position.

3. In an automatic heat regulating means, a heat and current conducting thermostat support means, a heat distortable thermostat loosely secured at its ends by said support means, a contact at the one end of said support means, another contact spaced apart from said first mentioned contact, a switch support, a switch slidably mounted therein and supported by the ends thereof, contacts on said switch adapted to connect said first and second mentioned contacts, the one end of said switch adapted to rest against the one end of said support when said switch is in its closed position, and means actuated by said thermostat for disengaging said switch from the one end of said switch support.

4. In an automatic heat regulating means, a heat and current conducting thermostat support means, a heat distortable thermostat loosely secured at its ends by said support means, a contact at the one end of said support means, another contact spaced apart from said first mentioned contact, a switch support, a switch slidably mounted therein and supported by the ends thereof, contacts on said switch adapted to connect said first and second mentioned contacts, the one end of said switch adapted to rest against the one end of said support when said switch is in its closed position, and means actuated by said thermostat for disengaging said switch with said switch support, and spring means for normally forcing said switch member to an open position.

5. In an automatic heat regulating means of the class described, a heat and current conductor, a heat distortable thermostat loosely supported at its ends contiguous to said conductor, a pair of contacts, one of said contacts being integral with said conductor, a switch support, a switch slidably mounted on said switch support, and means for releasably holding said switch in its closed position across said contacts, thermostat actuated means for releasing said switch from its closed position.

6. In an automatic heat regulating means of the class described, a heat and current conductor, a heat distortable thermostat loosely supported at its ends contiguous to said conductor, a pair of contacts, one of said contacts being integral with said conductor, a switch support, a switch slidably mounted on said switch support, means for releasably holding said switch in its closed position across said contact, thermostat actuated means for releasing said switch from its closed position, and spring means, the one end mounted in said switch support and the other end mounted in said switch for forcing said switch out of engagement with said contact.

7. In an automatic heat regulating means of the class described, a perforated casing adapted to be ventilated by the atmosphere, a heat and current conducting thermostat support means, a heat distortable thermostat loosely secured at its ends by said support means, a contact at the one end of said support means, another contact spaced apart from said first mentioned contact, a switch support, a switch slidably mounted thereon, contacts on said switch adapted to connect said first and second mentioned contacts, means for positively holding said switch in closed position on said switch support, means actuated by said thermostat for releasing said switch from engagement with said support.

8. In an automatic heat regulating means of the class described, a perforated casing adapted to be ventilated by the atmosphere, a heat and current conducting thermostat support means, a heat distortable thermostat loosely secured at its ends by said support means, a contact at the one end of said support means, another contact spaced apart from said first mentioned contact, a switch support, a switch slidably mounted thereon, contacts on said switch adapted to connect said first and second mentioned contacts, means for positively holding said switch in closed position on said switch support, means actuated by said thermostat for releasing said switch from engagement with said support, and spring means tending to force said switch member to an open position.

9. In an automatic heat regulating means of the class described, a perforated casing adapted to be ventilated by the atmosphere, a heat and current conducting thermostat support means, a heat distortable thermostat loosely secured at its ends by said support means, a contact at the one end of said support means, another contact spaced apart from said first mentioned contact, a switch support, a switch slidably mounted therein and supported by the ends thereof, contacts on said switch adapted to connect said first and second mentioned contacts, the one end of said switch adapted to rest against the one end of said support when said switch is in its closed position, and means actuated by said thermostat for disengaging said switch from the one end of said switch support.

10. In an automatic heat regulating means of the class described, a perforated casing adapted to be ventilated by the atmosphere, a heat and current conducting thermostat support means, a heat distortable thermostat loosely secured at its ends by said support means, a contact at the one end of said support means, another contact spaced apart from said first mentioned contact, a switch support, a switch slidably mounted therein and supported by the ends thereof, contacts on said switch adapted to connect said first and second mentioned contacts, the one end of said switch adapted to rest against the one end of said support when said switch is in its closed position, and means actuated by said thermostat for disengaging said switch with said switch support, and spring means tending to force said switch member to an open position.

11. In an automatic heat regulating means of the class described, a perforated casing adapted to be ventilated by the atmosphere, a heat and current conductor, a heat distortable thermostat loosely supported at its ends in said conductor, a pair of contacts, the one contact integral with said conductor, a switch support, a switch slidably mounted in the extended end of said switch support, means for releasably holding said switch in its closed position across said contact, and thermostat actuated means for releasing said switch from its closed position.

12. In an automatic heat regulating means of the class described, a perforated casing adapted to be ventilated by the atmosphere, a heat and current conductor, a heat distortable thermostat loosely supported at its ends in said conductor, a pair of contacts, the one contact integral with said conductor, a switch support, a switch slidably mounted in the extended end of said switch support, means for releasably holding said switch in its closed position across said contact, thermostat actuated means for releasing said switch from its closed position, and spring means, the one end mounted in said switch support and the other end mounted in said switch tending to force said switch out of engagement with said contact.

In testimony whereof, I have hereunto set my hand at San Diego, California, this 19th day of August, 1927.

MARTIN S. RUNSVOLD.